United States Patent
Huang et al.

(10) Patent No.: US 11,706,054 B2
(45) Date of Patent: Jul. 18, 2023

(54) METHODS, DISTRIBUTED BASE STATION SYSTEM, REMOTE RADIO UNIT AND BASE BAND UNIT SYSTEM FOR HANDLING UPLINK SIGNALS

(71) Applicant: Telefonaktiebolaget LM Ericsson (publ), Stockholm (SE)

(72) Inventors: Yezi Huang, Täby (SE); Miguel Berg, Sollentuna (SE); Chenguang Lu, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 17 days.

(21) Appl. No.: 17/608,601

(22) PCT Filed: May 3, 2019

(86) PCT No.: PCT/SE2019/050395
§ 371 (c)(1),
(2) Date: Nov. 3, 2021

(87) PCT Pub. No.: WO2020/226538
PCT Pub. Date: Nov. 12, 2020

(65) Prior Publication Data
US 2022/0217018 A1    Jul. 7, 2022

(51) Int. Cl.
*H04L 25/02* (2006.01)
*H04B 17/345* (2015.01)
*H04B 7/06* (2006.01)

(52) U.S. Cl.
CPC ....... *H04L 25/0224* (2013.01); *H04B 7/0617* (2013.01); *H04B 17/345* (2015.01);
(Continued)

(58) Field of Classification Search
CPC ... H04L 25/0224; H04L 25/02; H04L 25/021; H04L 25/0242; H04L 25/0256;
(Continued)

(56) References Cited

U.S. PATENT DOCUMENTS

2017/0373890 A1* 12/2017 Fertonani ............... H04L 69/32
2019/0268804 A1*  8/2019 Estella Aguerri .... H04B 7/0456
2019/0341985 A1* 11/2019 Chopra ............... H04B 7/0639

FOREIGN PATENT DOCUMENTS

WO    2018231107 A1    12/2018
WO    2020130895 A1     6/2020

OTHER PUBLICATIONS

Alnajjar, Khawla A., et al., "Low Complexity Receivers for Massive MIMO Cloud Radio Access Systems," International Conference on Signal Processing and Information Security (ICSPIS), Nov. 7, 2018, 4 pages.
(Continued)

*Primary Examiner* — Sung S Ahn
(74) *Attorney, Agent, or Firm* — Withrow & Terranova, PLLC

(57) ABSTRACT

A distributed base station system comprises a remote radio unit, RRU, and a base band unit, BBU, connected to the RRU over a fronthaul link, the RRU being connected to N antennas. The method comprising by the RRU: obtaining uplink signals as received at the N antennas from a number of User Equipment, UEs, wirelessly connected to the RRU; obtaining a channel estimation matrix of the wireless communication channels; determining an interference covariance estimation matrix based on the obtained channel estimation matrix and on other channel information different from the channel estimation matrix; sending information on the channel estimation matrix and on the interference covariance estimation matrix to the BBU; determining intermediate signals based on the uplink signals, the channel estimation matrix and the interference covariance estimation matrix, and sending the intermediate signals to the BBU.

20 Claims, 8 Drawing Sheets

(52) U.S. Cl.
CPC ........ *H04L 25/021* (2013.01); *H04L 25/0204* (2013.01); *H04L 25/0242* (2013.01)

(58) Field of Classification Search
CPC .. H04B 7/0617; H04B 17/345; H04B 17/318; H04B 17/336; H04B 17/309
See application file for complete search history.

(56) References Cited

OTHER PUBLICATIONS

Huang, Yezi, et al., "Functional Split of Zero-Forcing Based Massive MIMO for Fronthaul Load Reduction," IEEE Access, vol. 6, Jan. 1, 2018, pp. 6350-6359.

Roughgarden, Tim, et al., "CS168: The Modem Algorithmic Toolbox, Lecture #8: How PCA Works," Standford University, Apr. 20, 2016, 10 pages.

Sharma, Alok, et al., "Fast principal component analysis using fixed-point alogrithm," Pattern Recognition Letters, No. 28, Elsevier B.V., 2007, pp. 1151-1155.

Shin, Cheolkyu, et al., "Correlated Downlink-to-Uplink Interference Suppression for Full-Duplex C-RAN Systems," IEEE Transactions on Vehicular Technology, vol. 68, No. 3, Mar. 2019, pp. 3033-3037.

Yu, Kai-Bor, "Recursive Updating the Eigenvalue Decomposition of a Covariance Matrix," IEEE Transactions on Signal Processing, vol. 39, No. 5, May 1991, pp. 1136-1145.

International Search Report and Written Opinion for International Patent Application No. PCT/SE2019/050395, dated Dec. 18, 2019, 10 pages.

\* cited by examiner

METHODS, DISTRIBUTED BASE STATION SYSTEM, REMOTE RADIO UNIT AND BASE BAND UNIT SYSTEM FOR HANDLING UPLINK SIGNALS

This application is a 35 U.S.C. § 371 national phase filing of International Application No. PCT/SE2019/050395, filed May 03, 2019, the disclosure of which is incorporated herein by reference in its entirety.

TECHNICAL FIELD

The present disclosure relates generally to methods, remote radio units, and base band unit systems of distributed base stations, as well as distributed base station systems for handling uplink signals. More specifically, the present disclosure deals with such methods, units and systems when the remote radio unit has a plurality of antennas for receiving uplink signals, such as in Multiple Input Multiple Output (MIMO) systems. The present disclosure further relates to computer programs and carriers corresponding to the above methods, units and systems.

BACKGROUND

In a centralized radio access network (C-RAN), also called a distributed base station system, radio access network (RAN), processing is conducted by two separate units: a remote radio unit (RRU), and a base band unit (BBU). The BBU is connected to the RRU via a fronthaul link. The RRU is connected to one or more antennas through which the RRU wirelessly communicates with at least one user equipment (UE). The BBU is in its turn connected to other base station systems or base stations, and to a core network of a wireless communication system. The BBU is centralized and there may be more than one RRU connected to each BBU. Traditionally, the BBU performs advanced radio coordination features such as joint detection, joint decoding, coordinated multi-point transmission (CoMP), to increase the spectrum efficiency and network capacity, as well as baseband processing, whereas the RRUs perform radio frequency (RF) processing and transmission/reception of the RF processed signals. Such a split of base station functionality between BBU and RRU is called a physical layer—radio frequency (PHY-RF) split.

Originally, the RRU was designed to reduce the cable loss of the coax cables between an antenna tower top where the actual antennas are situated and the bottom of the antenna tower where the base station functionality is hosted. Therefore, before 5$^{th}$ Generation of mobile communication (5G), i.e. at 4G, e.g. Long Term Evolution (LTE), the RRU was rather simple and was mainly doing RF processing with limited baseband processing, if any.

When going from 4G to 5G, there is a need to increase the wireless communication capacity towards the UEs in order to be able to deliver requested data amounts per time period in 5G. One enabler of the mobile evolution towards 5G is massive Multiple Input Multiple Output (MIMO) in which each RRU has a plurality of antennas. In other words, massive MIMO exploits spatial multiplexing to improve spectrum efficiency by using antenna arrays at the RRU, which antenna array is equipped with N antennas simultaneously serving K user-layers in the same time-frequency resource. The typical scenario is N>>K. e.g., N is 64, 128 or 256 while K is 8 or 16. As shown, the number of antennas are quite large. Massive MIMO is often referred to as massive beamforming, which is able to form narrow beams and focus on different directions. It also benefits multi-user MIMO, which allows the transmissions from/to multiple UEs simultaneously over separate spatial channels resolved by the massive MIMO technologies, while keeping high capacity for each UE. To support such massive MIMO solutions, the required fronthaul link capacity needs to increase in proportion to the increase of number of antennas, when using the current PHY-RF split between functionality of BBU and RRU. This will dramatically drive up the fronthaul link costs.

To reduce the required fronthaul (FH) capacity, new functional splits within the physical layer (PHY) are discussed and proposed. Basically, some baseband PHY functions will be moved to the RRU, which mainly performs RF-related operations in the current Common Public Radio Interface (CPRI) based implementation. Two options for intra-PHY split have attracted attention.

Option 1: transport frequency-domain samples in FH, instead of transporting time-domain samples in CPRI. In this option, RRU needs to perform FFT/IFFT operations to transform between time domain and frequency domain samples. Here, option 1 is referred to as frequency domain FH (fdFH). In fdFH, the number of FH streams still equals to the number of antennas. One advantage of fdFH is the possibility that fdFH traffic is proportional to the air interface traffic load. The required peak capacity is still high when traffic is fully loaded.

Option 2: transport layer samples in FH. It means the MIMO or beamforming processing is done in the RRU. The number of FH streams are reduced to the number layers. For example, if the system is N=64 antennas and K=16 user layers, there are only 16 FH streams going through the FH link. Here option 2 is referred to as layer FH (IaFH). This can dramatically reduce the required FH capacity, which is also proportional to traffic load. However, moving the whole MIMO or beamforming processing to RRU increases significantly the complexity of RRU. The system is not scalable to support more antennas. It needs to replace the existing RRU to support more antennas. It also limits the joint-MIMO-processing possibility for coordinating multiple RRUs at different places.

Consequently there is a need to find solutions that balances the complexity of the RRU to the capacity limitations on the fronthaul.

In "Functional Split of Zero-Forcing Based Massive MIMO for Fronthaul Load Reduction," by Y. Huang, C. Lu, M. Berg and P. Ödling, published in IEEE Access, vol. 6, pp. 6350-6359, 2018, an intra-PHY functional split scheme between BBU and RRU regarding uplink is proposed. Instead of moving all MIMO/beamforming processing to RRU, the MIMO processing is decomposed to two parts. The first part requiring lower complexity is implemented in the RRU, while the second part requiring higher complexity is implemented in the BBU. The proposed intra-PHY functional split takes advantage of a formation feature of a known Zero-forcing (ZF) method and separates the MIMO processing into a maximum ratio combining (MRC) part and an interference-cancellation part. The MRC processing only carries out Hermitian transpose of the estimated channel. This is computationally light and therefore the MRC processing is moved to the RRU. The interference cancellation part contains matrix inversion, which is computationally heavy, is instead carried out in the BBU. This scheme reduces the number of FH streams to the number of layers and achieve the same performance as an original ZF-based approach when it is implemented totally in RRU. However, the proposed intra-PHY functional split using the ZF-based method does not consider inter-cell interference, i.e. interference from UEs connected to other base stations. Consequently, the performance degrades when strong inter-cell interferences are present.

In uplink MIMO systems, a minimum mean square error-interference rejection combining method (MMSE-IRC) achieves better performance than a ZF-based method, since it also mitigates the co-channel interferences from other cells while cancel the intra-cell interferences. However, the IRC coefficients for an N-antenna base station requires to calculate an N×N matrix inversion plus some other N-dimensional matrix multiplications. So, the complexity is much higher than the ZF-based method which requires a K×K matrix inversion where K is the number of user layers. Consequently, to use an MMSE-IRC based method would dramatically increase the complexity of the RRU. Similar to the ZF-based method when implementing MMSE-IRC in the RRU, the system would not be scalable to support more antennas. Therefore, it would be beneficial also if the IRC processing can be distributed between the RRU and the BBU, instead of having all IRC processing in the RRU.

SUMMARY

It is an object of the invention to address at least some of the problems and issues outlined above. An object of embodiments of the invention is to balance complexity of the RRU to capacity limitations on the fronthaul. Another object of embodiments of the invention is to handle inter-cell interference for UL transmissions. It is possible to achieve these objects and others by using methods, network nodes and wireless communication devices as defined in the attached independent claims.

According to one aspect, a method is provided performed by a distributed base station system of a wireless communication network. The distributed base station system comprises a RRU and a BBU connected to the RRU over a fronthaul link. The RRU is connected to N antennas. The method comprises obtaining, by the RRU, uplink signals y as received at the N antennas from a number of UEs wirelessly connected to the RRU, the N uplink signals comprising K user-layer signals overlaid with J interference signals and noise, and obtaining, by the RRU, a channel estimation matrix $\hat{H}$ of wireless communication channels H between the number UEs and the N antennas from reference signals $y_{ref,l}$ as received at the N antennas from the number of UEs. The method further comprises determining, by the RRU, an interference covariance estimation matrix $\hat{R}$ based on the obtained channel estimation matrix $\hat{H}$ and on other channel information different from the channel estimation matrix, and sending, by the RRU, information on the channel estimation matrix $\hat{H}$ and on the interference covariance estimation matrix $\hat{R}$ over the fronthaul link to the BBU. The method further comprises determining, by the RRU, intermediate signals $\tilde{y}$, based on the uplink signals y, the channel estimation matrix $\hat{H}$ and the interference covariance estimation matrix $\hat{R}$, the intermediate signals having K+L components, where (K+L) is smaller than N, and L is larger than zero, and sending, by the RRU, the determined intermediate signals $\tilde{y}$ over the fronthaul link to the BBU. The method further comprises determining, by the BBU, a beamforming matrix $W_K$ based on the information sent by the RRU on the channel estimation matrix $\hat{H}$ and on the interference covariance estimation matrix $\hat{R}$, and determining, by the BBU, output signals r, which are estimations of the K user-layer signals, by multiplying the intermediate signals $\tilde{y}$ sent by the RRU with beamforming weights of the beamforming matrix $W_K$.

According to another aspect, a method is provided performed by a RRU of a distributed base station system of a wireless communication network. The distributed base station system further comprises a BBU connected to the RRU over a fronthaul link. The RRU is connected to N antennas. The method comprises obtaining uplink signals y as received at the N antennas from a number of UEs wirelessly connected to the RRU, the uplink signals comprising K user-layer signals overlaid with J interference signals and noise, and obtaining a channel estimation matrix $\hat{H}$ of wireless communication channels H between the number UEs and the N antennas from reference signals $y_{ref,l}$ as received at the N antennas from the number of UEs. The method further comprises determining an interference covariance estimation matrix $\hat{R}$ based on the obtained channel estimation matrix $\hat{H}$ and on other channel information different from the channel estimation matrix, and sending information on the channel estimation matrix $\hat{H}$ and on the interference covariance estimation matrix $\hat{R}$ over the fronthaul link to the BBU. The method further comprises determining intermediate signals $\tilde{y}$, based on the uplink signals y, the channel estimation matrix $\hat{H}$ and the interference covariance estimation matrix $\hat{R}$, the intermediate signals having K+L components, where (K+L) is smaller than N, and L is larger than zero, and sending to the BBU over the fronthaul link, the determined intermediate signals $\tilde{y}$.

According to another aspect, a method is provided performed by a BBU system of a wireless communication network. The wireless communication network comprises a distributed base station system having a BBU and an RRU connected to the BBU over a fronthaul link. The RRU has N antennas. The method comprising receiving, from the RRU, a plurality of intermediate signals $\tilde{y}$ with K+L components, where (K+L) is smaller than N, determined by the RRU based on a channel estimation matrix $\hat{H}$, on an interference covariance estimation matrix $\hat{R}$ determined based on the channel estimation matrix $\hat{H}$ and on other channel information different from the channel estimation matrix, and on uplink signals y with N components as received by the N antennas from a number of UEs, the uplink signals y comprising K user-layer signals overlaid with J interference signals and noise, and receiving, from the RRU, information on the channel estimation matrix $\hat{H}$ and on the interference covariance estimation matrix $\hat{R}$. The method further comprises determining a beamforming matrix $W_K$ based on the received information on the channel estimation matrix $\hat{H}$ and on the interference covariance estimation matrix $\hat{R}$, and determining an output signals r, which are an estimation of the K user-layer signals, by multiplying the intermediate signals $\tilde{y}$ with beamforming weights of the beamforming matrix $W_K$.

According to another aspect, a distributed base station system operable in a wireless communication network is provided. The distributed base station system comprises a BBU and an RRU connected to the BBU over a fronthaul link. The RRU is connected to N antennas. The distributed base station system comprises a processing circuitry and a memory. Said memory contains instructions executable by said processing circuitry, whereby the distributed base station system is operative for obtaining, by the RRU, uplink signals y as received at the N antennas from a number of UEs wirelessly connected to the RRU 120, the N uplink signals comprising K user-layer signals overlaid with J interference signals and noise, and obtaining, by the RRU, a channel estimation matrix $\hat{H}$ of wireless communication channels H between the number UEs and the N antennas from reference signals $y_{ref,l}$ as received at the N antennas from the number of UEs. Further, the distributed base station system is operative for determining, by the RRU, an interference covariance estimation matrix $\hat{R}$ based on the obtained channel estimation matrix $\hat{H}$ and on other channel information different from the channel estimation matrix, and sending, by the RRU, information on the channel estimation matrix $\hat{H}$ and on the interference covariance estimation matrix $\hat{R}$ over the fronthaul link to the BBU. Further, the distributed base station system is operative for determining, by the RRU, intermediate signals based on the uplink signals y, the channel estimation matrix $\hat{H}$ and the interference covariance estimation matrix $\hat{R}$, the intermediate signals having K+L components, where (K+L) is smaller than N, and L is larger than zero, and sending, by the RRU, the determined intermediate signals $\tilde{y}$ over the fronthaul link to the BBU. Further, the distributed base station system is operative for determining, by the BBU, a beamforming matrix $W_K$ based on the information sent by the RRU on the channel estimation matrix $\hat{H}$ and on the interference covariance estimation matrix $\hat{R}$, and determining, by the BBU, output signals r, which are estimations of the K user-layer signals, by multiplying the intermediate signals $\tilde{y}$ sent by the RRU with beamforming weights of the beamforming matrix $W_K$.

According to another aspect, an RRU operable in a distributed base station system of a wireless communication network is provided. The distributed base station system further comprises a BBU connected to the RRU over a fronthaul link. The RRU is operable to be connected to N antennas. The RRU comprises a processing circuitry and a memory. Said memory contains instructions executable by said processing circuitry, whereby the RRU is operative for obtaining uplink signals y as received at the N antennas from a number of UEs wirelessly connected to the RRU, the uplink signals comprising K user-layer signals overlaid with J interference signals and noise, and obtaining a channel estimation matrix $\hat{H}$ of wireless communication channels H between the number UEs and the N antennas from reference signals $y_{ref,l}$ as received at the N antennas from the number of UEs. Further, the RRU is operative for determining an interference covariance estimation matrix $\hat{R}$ based on the obtained channel estimation matrix $\hat{H}$ and on other channel information different from the channel estimation matrix, and sending information on the channel estimation matrix $\hat{H}$ and on the interference covariance estimation matrix $\hat{R}$ over the fronthaul link to the BBU. Further, the RRU is operative for determining intermediate signals $\tilde{y}$, based on the uplink signals y, the channel estimation matrix $\hat{H}$ and the interference covariance estimation matrix $\hat{R}$, the intermediate signals having K+L components, where (K+L) is smaller than N, and L is larger than zero, and sending to the BBU over the fronthaul link, the determined intermediate signals $\tilde{y}$.

According to another aspect, a BBU system is provided operable in a wireless communication network. The wireless communication network comprises a distributed base station system having a BBU and an RRU connected to the BBU over a front haul connection. The RRU has N antennas. The BBU system comprises a processing circuitry and a memory. Said memory contains instructions executable by said processing circuitry, whereby the BBU system is operative for receiving, from the RRU, a plurality of intermediate signals $\tilde{y}$ with K+L components, where (K+L) is smaller than N, determined by the RRU based on a channel estimation matrix $\hat{H}$, on an interference covariance estimation matrix $\hat{R}$ determined based on the channel estimation matrix $\hat{H}$ and on other channel information different from the channel estimation matrix, and on uplink signals y with N components as received by the N antennas from a number of UEs, the uplink signals y comprising K user-layer signals overlaid with J interference signals and noise. Further, the BBU system is operative for receiving, from the RRU, information on the channel estimation matrix $\hat{H}$ and on the interference covariance estimation matrix $\hat{R}$, determining a beamforming matrix $W_K$ based on the received information on the channel estimation matrix $\hat{H}$ and on the interference covariance estimation matrix $\hat{R}$, and determining output signals r, which are an estimation of the K user-layer signals, by multiplying the intermediate signals $\tilde{y}$ with beamforming weights of the beamforming matrix $W_K$.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
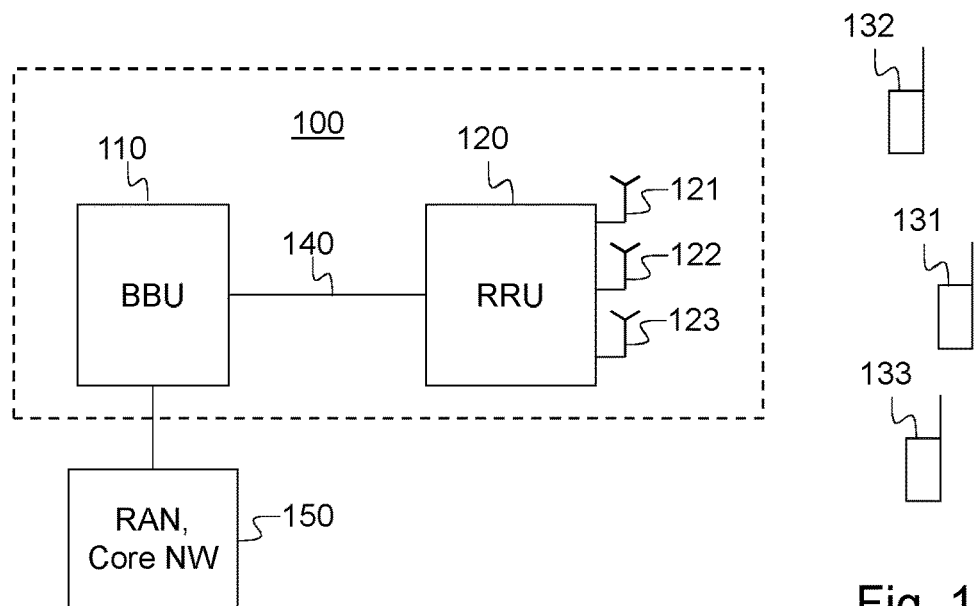
FIG. 1 is a schematic block diagram of a wireless communication system comprising a distributed base station system in which the present invention can be used.

Briefly described, a solution is provided to offload some RRU complexity to the BBU and in at least some embodiments to make an IRC system scalable to support more antennas at the RRUs, while keeping a moderate fronthaul (FH) traffic load. Parts of this disclosure presents a method in which the mathematical formulation of the IRC method, as shown further down by equation (1) is reformulated as a ZF (zero-forcing) method of an extended "channel" including interference aspects, and then the ZF process is decomposed into two parts. The first part performs MRC, which is much simpler than the full IRC and is therefore implemented in the RRU. The second part takes remaining calculations, such as matrix inversion, with high complexity and is implemented in the BBU.

Comparing to the CPRI-based FH, the number of required FH streams can be reduced to the number of desired user layers plus the number of the interfering user layers of the co-channel interfering UEs from other cells, to fully mitigate these co-channel interferences by IRC processing. This is theoretically sound as the number of the degrees of freedom are reserved to the BBU to mitigate both intra-cell and inter-cell interferences, i.e. the interferences between desired user layers in the same cell and the interferences from the interfering user layers from other cells.

Further, when comparing the present invention to co-pending application PCT/SE2018/051344 from the same applicant, the method of the co-pending application is only based on instant interference-and-noise samples obtained from the received reference signals and the channel estimation at the RRU. The interference covariance matrix is not explicitly estimated, though the interference samples represent some information of the interference covariance matrix. The accuracy of such information can be quite good to perform IRC. But the accuracy is limited by the available number of samples and the fact that such implicit estimation is biased. This may negatively impact the IRC performance. However, an advantage of the method of the co-pending application is that it is quite simple without the need for explicit estimation of the interference covariance matrix.

According to embodiments of the invention, the IRC performance can be improved when the interference covariance matrix is explicitly estimated with more channel information than the instant interference-and-noise samples. Apart from using the reference signal samples, other channel information, such as signal to interference and noise (SINR) estimations at the base-station side and/or from UE feedback regarding downlink channel conditions, such as Channel Quality Indicator (CQI), Reference Signal Received Power (RSRP), Reference Signal Received Quality (RSRQ), can be used to improve the covariance estimation. Hereby high performance is achieved at the air interface with lower complexity in RRU, and the FH load is reduced to be related to the number of user-layers K and the number of co-channel interferers J.

FIG. 1 illustrates a wireless communication network in which the present invention may be used. The wireless communication network comprises a distributed base station system 100, which in turn comprises a BBU 110 and a RRU 120. The BBU 110 has connections to other base station nodes or other RAN nodes and further to a core network (symbolized with 150 in FIG. 1) so that the distributed base station system can communicate to other nodes of the communication network. The BBU is connected with the RRU via a fronthaul link 140. The fronthaul link 140 may be any kind of connection, such as a dedicated wireline or wireless connection or a connection via a network, as long as the connection fulfils fronthaul requirements, e.g. in capacity and latency. The RRU further has a plurality of antennas 121, 122, 123 through which wireless signals are communicated towards and from one or more UEs 131, 132, 133. The wireless signals comprises data to be communicated from or to the UEs 131, 132, 133. The BBU 110 and the RRU 120 comprise RAN functionality for handling the data and signals to be communicated between the RRU 120 and the UEs 131, 132, 133. The RAN functionality is distributed between the BBU and the RRU as will be described further down in this disclosure.

The wireless communication network in which the distributed base station 100 is to be used may be any kind of wireless communication network that can provide radio access to wireless communication devices. Examples of such wireless communication networks are Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE), LTE Advanced, Wireless Local Area Networks (WLAN), Worldwide Interoperability for Microwave Access (WiMAX), WiMAX Advanced, as well as fifth generation wireless communication networks based on technology such as New Radio (NR).

The UEs 131, 132, 133 may be any type of communication device capable of wirelessly communicating with the RRU 120 using radio signals. For example, the UEs may be a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

Figure 2:
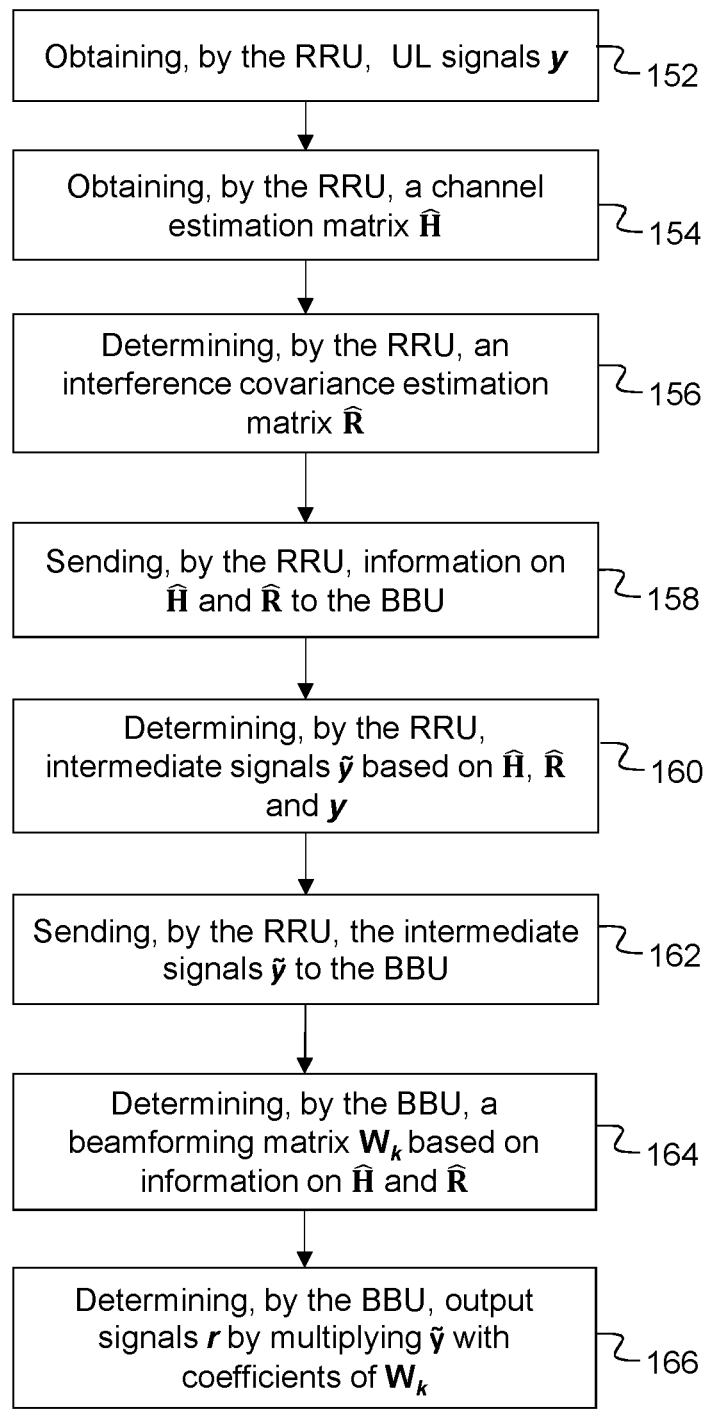
FIG. 2 is a flow chart illustrating a method performed by a distributed base station system, according to possible embodiments.

FIG. 2, in conjunction with FIG. 1, describes a method performed by a distributed base station system 100 of a wireless communication network. The distributed base station system 100 comprises a RRU 120 and a BBU 110 connected to the RRU over a fronthaul link 140. The RRU 120 is connected to N antennas 121, 122, 123. The method comprises obtaining 152, by the RRU, uplink signals y as received at the N antennas 121, 122, 123 from a number of UEs 131, 132, 133, wirelessly connected to the RRU 120, the N uplink signals comprising K user-layer signals overlaid with J interference signals and noise, and obtaining 154, by the RRU, a channel estimation matrix $\hat{H}$ of wireless communication channels H between the number UEs 131, 132, 133 and the N antennas 121, 122, 123 from reference signals $y_{ref,i}$ as received at the N antennas from the number of UEs. The method further comprises determining 156, by the RRU, an interference covariance estimation matrix $\hat{R}$ based on the obtained channel estimation matrix $\hat{H}$ and on other channel information different from the channel estimation matrix, and sending 158, by the RRU, information on the channel estimation matrix $\hat{H}$ and on the interference covariance estimation matrix $\hat{R}$ over the fronthaul link to the BBU 110. The method further comprises determining 160, by the RRU, intermediate signals $\tilde{y}$, based on the uplink signals y, the channel estimation matrix $\hat{H}$ and the interference covariance estimation matrix $\hat{R}$, the intermediate signals having K+L components, where (K+L) is smaller than N, and L is larger than zero, and sending 162, by the RRU, the determined intermediate signals $\tilde{y}$ over the fronthaul link to the BBU 110. The method further comprises determining 164, by the BBU, a beamforming matrix $W_K$ based on the information sent 158 by the RRU on the channel estimation matrix $\hat{H}$ and on the interference covariance estimation matrix $\hat{R}$, and determining 166, by the BBU, output signals r, which are estimations of the K user-layer signals, by multiplying the intermediate signals $\tilde{y}$ sent 162 by the RRU with beamforming weights of the beamforming matrix $W_K$.

The "interference signals" are signals originating from UEs wirelessly connected to other base stations or base station systems than this base station system. The K user-layer signals use the same time-frequency resource when transmitted wirelessly from the UEs to the RRU. "N" in "N antennas" are an integer greater than 1. When the invention is of most benefit, the number of antennas "N" is larger than K. The obtained uplink signals y comprises N components. The obtained uplink signals y can be described as y=[$y_1$ $y_2$ ... $y_N$]$^T$, where [$y_1$ $y_2$ ... $y_N$]$^T$ is the transpose of vector [$y_1$ $y_2$ ... $y_N$]. The obtained uplink signals y can be modelled as a vector where $y_i$ represents the received signal at the i-th antenna among the N antennas. The fronthaul link 140 may be any kind of connection connecting the RRU to the BBU, such as a dedicated wireline or wireless connection or a connection via a network, as long as the connection fulfils fronthaul requirements, e.g. in capacity and latency. One channel estimation matrix Ĥ is determined for a limited time period and frequency range. According to an embodiment, the channel is estimated for each resource block (RB). According to an embodiment, the channel estimation matrix is obtained based on knowledge of one or more reference signals as sent by the number of UEs and on the reference signal as it looks when received at the N antennas. The received first reference signal is measured when received at each antenna. The channel estimation matrix Ĥ is then determined based on the measured reference signal at each antenna and on a knowledge of what the received reference signal looked like when it was sent from the UEs, aka the sent reference signal. The difference of the sent reference signal and the received reference signal is due to the conditions of the wireless channel between the UEs and the antennas of the RRU, but also due to interference from other UEs belonging to other base stations and due to noise. The wireless communication channel may be estimated by using for example a least-square estimation on the known sent first reference signal and the received first reference signals, if channel distribution and noise distribution is unknown or, if channel and noise distribution is known, by using a Minimum Mean Square Error (MMSE) estimation. Such different methods for obtaining a channel estimation matrix Ĥ is well-known to a person skilled in the art, for which reason those methods are not further elaborated on here The interference covariance matrix R̂ comprises information of interfering signals from UEs connected to other base stations than this distributed base station system. By sending information of Ĥ and R̂, to the BBU, the beamforming processing can be split up between the RRU and the BBU. More specifically, the RRU determines intermediate signals ỹ having K+L components, i.e. less components than all N signal components of the uplink signals y. L is a number of FH streams transported via the FH link additional to K. L is a number related to a number of interferences J to be mitigated. To achieve the performance as good as non-split approach, L should be larger than or equal to J. L can be a system parameter, which can be dynamically changed according to the current interference situation. The largest possible value of L can be also limited by the FH capacity available and the processing power available. L may resemble the number of interferers in the cell. The intermediate signals are sent over the fronthaul link to the BBU. As the intermediate signals has fewer signal components (K+L) than the N uplink signals, less information is sent over the fronthaul link compared to sending the uplink signals y as they are over the fronthaul link, and capacity of the fronthaul link is saved. In order for the BBU to be able to do the rest of the beamforming processing, information of Ĥ and R̂ are sent over the fronthaul link to the BBU. As some of the beam forming processing is performed in the BBU, processing power in the RRU is saved a more cost-efficient RU can be achieved compared to a solution where all beam forming processing is performed in the RRU. Further, the interference covariance estimation matrix R̂ can be estimated as Z Z*, where Z is an error estimation matrix, which is determined based on the channel estimation matrix Ĥ. By according to claim 1, estimating R̂ from two sources of information, i.e. Ĥ and on another channel information different from the channel estimation matrix Ĥ and not only using the channel estimation matrix, an even better approximation of R can be achieved compared to R̂≈ZZ*, the estimation accuracy is further improved.

Figure 3:
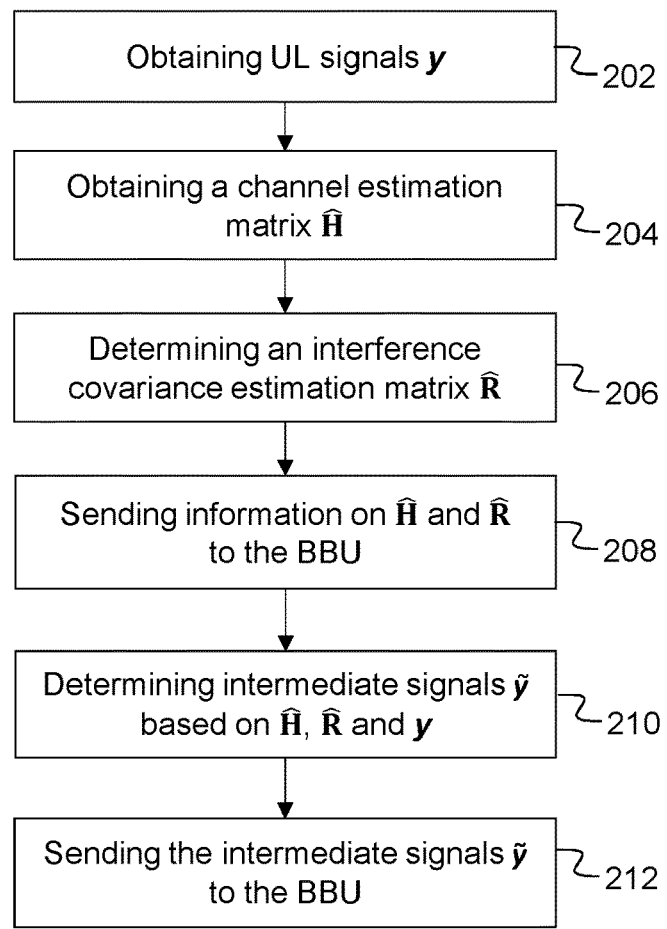
FIG. 3 is a flow chart illustrating a method performed by a RRU, according to possible embodiments.

FIG. 3, in conjunction with FIG. 1, describes a method performed by a RRU 120 of a distributed base station system 100 of a wireless communication network. The distributed base station system 100 further comprises a BBU 110 connected to the RRU over a fronthaul link 140. The RRU 120 is connected to N antennas 121, 122, 123. The method comprises obtaining 202 uplink signals y as received at the N antennas 121, 122, 123 from a number of UEs 131, 132, 133 wirelessly connected to the RRU 120, the uplink signals comprising K user-layer signals overlaid with J interference signals and noise, and obtaining 204 a channel estimation matrix Ĥ of wireless communication channels H between the number UEs 131, 132, 133 and the N antennas 121, 122, 123 from reference signals $y_{ref,l}$ as received at the N antennas from the number of UEs. The method further comprises determining 206 an interference covariance estimation matrix R̂ based on the obtained channel estimation matrix Ĥ and on other channel information different from the channel estimation matrix, and sending 208 information on the channel estimation matrix Ĥ and on the interference covariance estimation matrix R̂ over the fronthaul link to the BBU (110). The method further comprises determining 210 intermediate signals ỹ, based on the uplink signals y, the channel estimation matrix Ĥ and the interference covariance estimation matrix R̂, the intermediate signals having K+L components, where (K+L) is smaller than N, and L is larger than zero, and sending 212 to the BBU 110 over the fronthaul link 140, the determined intermediate signals ỹ.

The method described comprises a first part of beamforming performed by the RRU of a distributed base station. The beamforming is quite accurate as the interference covariance matrix R̂ is determined not just from the channel estimation Ĥ but also from another channel information, which is not the channel estimation matrix Ĥ. Further, by determining intermediate signals ỹ having much less components than the N components of the uplink signals, less data needs to be sent over the fronthaul link compared to sending the uplink signals directly. Also, by sending information of the channel estimation matrix and the interference covariance matrix to the BBU, the BBU can perform the second part of beamforming with a high accuracy. The total amount of data sent over the fronthaul link, i.e. the intermediate signals and the information on the channel estimation matrix and the interference covariance matrix are still considerably less than when the uplink signals are sent directly over the fronthaul link.

According to an embodiment, the other channel information is downlink channel feedback received by the RRU from the number of UEs. Downlink channel feedback from the UEs are based on measurements or the like of the UEs on downlink signals sent by the RRU. In other words, channel feedback from the UEs reflects how the UE perceives the DL channel, and the channel estimation matrix Ĥ how the RRU perceives the UL channel between the same UEs and RRU. Especially for a TDD-based systems, the UL and DL channel between the same UEs and RRU can be assumed to be reciprocal and therefore such an approach is advantageous in TDD-based systems, and other systems that can be assumed to be reciprocal. Channel feedback from the UEs may be channel quality information of downlink signals. The channel quality information may be Channel Quality Indicator (CQI), Reference Signal Received Power (RSRP), Reference Signal Received Quality (RSRQ), Signal to Interference and Noise Ratio (SINR). Such channel quality information is already sent by the UEs and those existing measurements can be used, which is communication resource efficient.

According to another embodiment, the other channel information is uplink channel quality information. When the other channel information is uplink channel quality information i.e. channel quality measurements performed at the RRU, the interference covariance estimation matrix $\hat{R}$ is estimated from two different sources of information of the uplink communication channel: the channel estimation matrix $\hat{H}$ and the channel quality information, which results in an accurate estimation of $\hat{R}$. The uplink channel quality information may be Signal to Interference and Noise Ratio (SINR) estimations, signal strength measurements, Signal to Interference (SIR) estimations etc. on signals sent by the UEs and received at the RRU.

According to another embodiment, the determining 210 of the intermediate signals $\tilde{y}$ comprises multiplying the received incoming signal y with the transpose and conjugate $A^*$ of an extended channel matrix A, which is obtained based on the channel estimation matrix A and on the interference covariance estimation matrix $\hat{R}$. The transpose and conjugate $A^*$ of a matrix A could also be called the Hermitian transpose of matrix A. Such a measure can be seen as applying an MRC operation for the extended channel A. The extended channel takes account for the interference, via $\hat{R}$. An MRC operation is fairly non-complex so it does not need very much processing power. The more complex calculations are left for the BBU. The intermediate signal is reduced from N to K+L streams, meaning that the amount of data sent over the fronthaul link 140 is reduced.

According to another embodiment, the extended channel matrix A comprises the channel estimation matrix $\hat{H}$ and an intermediate matrix G, wherein the intermediate matrix G is obtained from a decomposition of the interference covariance estimation matrix $\hat{R}$, wherein $\hat{R}$ is approximated as $GG^*$. Hereby the IRC process is reformulated into a ZF process, which enables a desired split solution in which RRU complexity is lower and the number of FH streams is reduced. Further, $\hat{R}$ has N columns while G only has L columns so by such a measure the number of components of the intermediate signal $\tilde{y}$ is reduced to K+L.

According to another embodiment, the intermediate matrix G is obtained based on an eigenvalue decomposition of the interference covariance estimation matrix $\hat{R}$. Hereby, a dimension-reduced intermediate matrix can be achieved which reduces the computational complexity of the RRU and therefore makes it possible with a more cost-efficient RRU.

According to another embodiment, the information on the channel estimation matrix $\hat{H}$ and the interference covariance estimation matrix $\hat{R}$ sent 208 over the fronthaul link is information on the extended channel matrix A.

According to another embodiment, the information on the extended channel matrix A is coefficients of $A^*A$. The number coefficients of $A^*A$ are less than the number of coefficients of A so this means less data is needed to be sent over the fronthaul link, however one matrix multiplication needs to be done in the RRU before sending. This is especially advantageous if the fronthaul capacity is the narrow sector.

Figure 4:
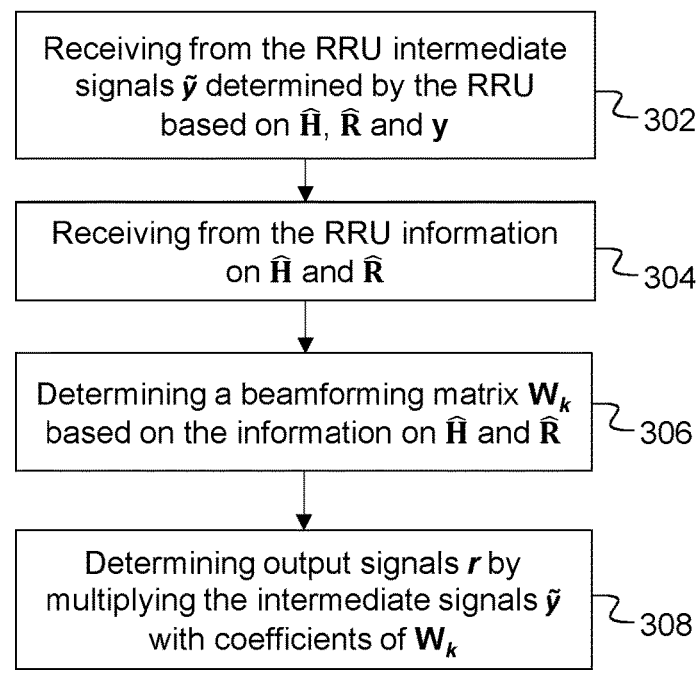
FIG. 4 is a flow chart illustrating a method performed by a BBU, according to possible embodiments.

FIG. 4, in conjunction with FIG. 1, describes a method performed by a BBU system 700 of a wireless communication network. The wireless communication network comprises a distributed base station system 100 having a BBU 110 and an RRU 120 connected to the BBU 110 over a fronthaul link 140. The RRU has N antennas 121, 122, 123. The method comprising receiving 302, from the RRU 120, a plurality of intermediate signals $\tilde{y}$ with K+L components, where (K+L) is smaller than N, determined by the RRU based on a channel estimation matrix $\hat{H}$, on an interference covariance estimation matrix $\hat{R}$ determined based on the channel estimation matrix $\hat{H}$ and on other channel information different from the channel estimation matrix, and on uplink signals y with N components as received by the N antennas 121, 122, 123 from a number of UEs 131, 132, 133, the uplink signals y comprising K user-layer signals overlaid with J interference signals and noise, and receiving 304, from the RRU 120, information on the channel estimation matrix $\hat{H}$ and on the interference covariance estimation matrix $\hat{R}$. The method further comprises determining 306 a beamforming matrix $W_K$ based on the received information on the channel estimation matrix $\hat{H}$ and on the interference covariance estimation matrix $\hat{R}$, and determining 308 an output signals r, which are an estimation of the K user-layer signals, by multiplying the intermediate signals $\tilde{y}$ with beamforming weights of the beamforming matrix $W_K$.

The output signals r are an estimation of the K user-layer signals with interference mitigated. The output signals r are then further treated, such as being sent for demodulation at the BBU. The BBU system of the wireless communication network that performs the method may be the BBU 110. Alternatively, the BBU system may be any other network node of the communication network, such as a node further away from the UE, e.g. another network element in the RAN or close to the RAN or another RAN node. In this alternative, the BBU 110 receives from the RRU 120, the intermediate signals $\tilde{y}$, and communicates the intermediate signals to the other network node that performs the determining steps. Alternatively, the BBU system may be a group of network nodes, wherein functionality for performing the method are spread out over different physical, or virtual, nodes of the network. The latter may be called a "cloud-solution". By receiving K+L intermediate signals instead of N uplink signals, K+L being smaller than N, fronthaul capacity is saved.

According to an embodiment, the beamforming matrix $W_K$ is determined 306 as the first K rows of $(A^*A)^{-1}$, where A is an extended channel matrix, which is obtained based on the channel estimation matrix $\hat{H}$ and on the interference covariance estimation matrix $\hat{R}$, and $A^*$ is the transpose and conjugate of the extended channel matrix A. As shown, the inverse matrix calculation is performed at the BBU, leaving the RRU with the less processor intensive calculations.

According to another embodiment, the extended channel matrix A comprises the channel estimation matrix $\hat{H}$ and an intermediate matrix G, wherein the intermediate matrix G is obtained from a decomposition of the interference covariance estimation matrix $\hat{R}$, wherein $\hat{R}$ is approximated as $GG^*$.

According to another embodiment, the information on the channel estimation matrix $\hat{H}$ and the interference covariance estimation matrix $\hat{R}$ received 304 from the RRU over the fronthaul link is information on the extended channel matrix A.

According to another embodiment, the received 304 information on the channel estimation matrix $\hat{H}$ and on the interference covariance estimation matrix $\hat{R}$, contains ingredients from the channel estimation matrix $\hat{H}$ and information on the other channel information different from the channel estimation matrix. Hereby, the beamforming matrix $W_K$ is determined based on the channel estimation matrix $\hat{H}$ and also on the other channel information, and thanks to the extra channel information, the output signal r becomes a more accurate approximation of the K user-layer signals.

In the following embodiment, a scenario is described with K user layers in a desired cell. In antenna-element domain or beam/direction domain, the wireless communication channel from the number of UEs in the desired cell, called target users, to the RRU is denoted as $H \in \mathbb{C}^{N \times K}$, where N is the number of antennas of the RRU. The transmit signals from the target users to the base station are denoted as $x=[x_1, x_2, \ldots, x_k, \ldots, x_K]^T$, where $[x_1, x_2, \ldots, x_K]^T$ is the transpose of vector $[x_1, x_2, \ldots, x_K]$ and $x_k$ is the transmit signal originating from the k-th user layer. Meanwhile, there are interference signals received by this base station system originating from UEs wirelessly connected to other base stations or base station systems than this base station system. The wireless communication channel between the interfering UE and the RRU of this base station system is denoted as $H_I \in \mathbb{C}^{N \times J}$, where J denote the number of interferences. The interfering signals originating from the interfering users are denoted as $x_I=[x_{I,1}, x_{I,2}, \ldots, x_{I,j}, \beta, x_{I,J}]^T$, where $x_{I,j}$ denotes the j-th interference signal. The uplink signals $y=[y_1, y_2, \ldots, y_N]^T$ as received at the N antennas of the RRU of this base station system from the UEs can be expressed as $$y = Hx + H_I x_I + n$$

where $n=[n_1, n_2, \ldots, n_N]^T \in \mathbb{C}^{N \times 1}$ denotes the additive background noise. The received uplink signals, therefore, comprises K user-layer signals overlaid with interference signals and noise. The covariance matrix R of interference-channel-and-noise-power is $R = H_I C_{x_I x_I} H_I^* + \sigma^2 I_N$, where $C_{x_I x_I} = E[x_I x_I]$ denotes the covariance matrix of the interference signal vectors, $\sigma^2$ is the background noise power and $I_N$ denotes an N×N identity matrix. The IRC beamforming coefficients can be formulated as $$W_{IRC} = \hat{H}^* (\hat{H}\hat{H}^* + \hat{R})^{-1} \quad (1)$$

where $\hat{H}$ is the estimation of the wireless communication channel H, $\hat{H}^*$ denotes the Hermitian transpose of $\hat{H}$, and $\hat{R}$ is the estimated R, shortly referred to as interference-covariance estimation matrix.

Then the processed signal after IRC is expressed as $$r = W_{IRC} y$$

where $r=[r_1, r_2, \ldots, r_K]^T$ is an estimation of the K user-layer signals. In practice, R can be estimated by the receiver in various ways under different estimation criteria, e.g. Least Square (LS), Minimum Mean Square Error (MMSE), Linear MMSE (LMMSE) etc., based on, for example, reference signals like Sounding Reference Signal (SRS), De-Modulation Reference Signal (DMRS), and other information like SINR estimate and UE feedback on channel conditions. In this embodiment, we assume the estimation is obtained at the RRU. As the existing IRC algorithms usually assume this also, the proposed scheme is compliant to the implementation framework for these algorithms.

Figure 5:
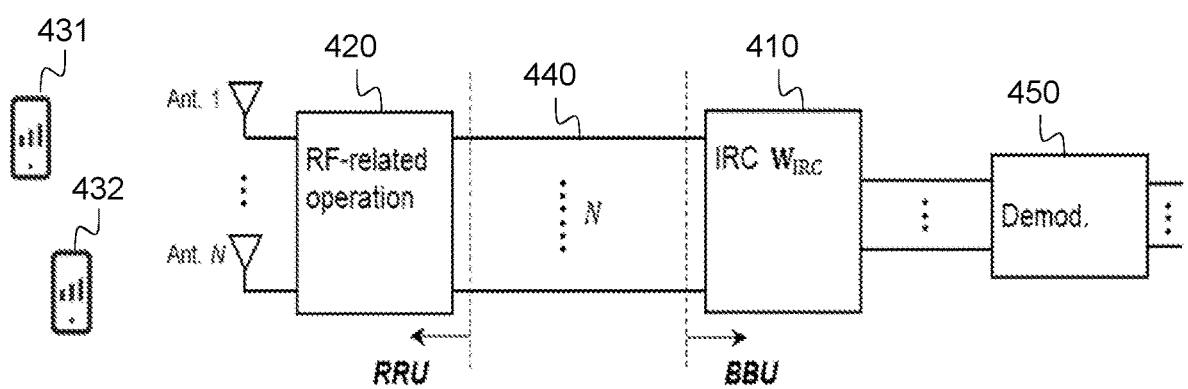
FIG. 5 is a schematic block diagram of a split of functionalities between the RRU and the BBU according to prior art.

FIG. 5 describes a CPRI-based FH functionality architecture. The functionality comprises RF-related operation functionality 420, IRC computation functionality 410 and demodulation functionality 450. 440 symbolizes the fronthaul link between the RRU and the BBU. The RRU has N antennas for receiving signals K user-layer signals from UEs 431, 432. In this architecture, the IRC computation functionality 410 is implemented at the BBU whereas the RRU only has the RF-related operation functionality 420. The demodulation functionality 450, at which the K user-layer signals as reconstructed by the RRU and the BBU is demodulated, is implemented at the BBU. This FH functionality architecture requires N FH streams to carry the time-domain samples from the N antennas from the RRU to the BBU, which requires a huge amount of FH capacity when the number of antennas N is large.

Figure 6:
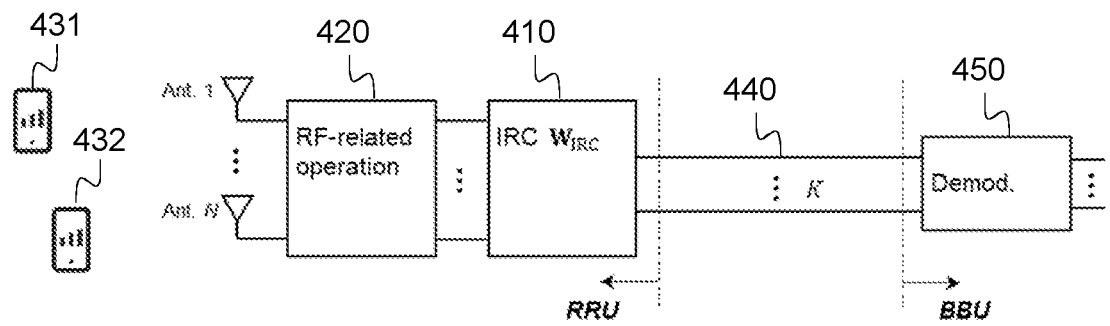
FIG. 6 is a schematic block diagram of another type of split of functionalities between the RRU and the BBU according to another prior art.
Figure 7:
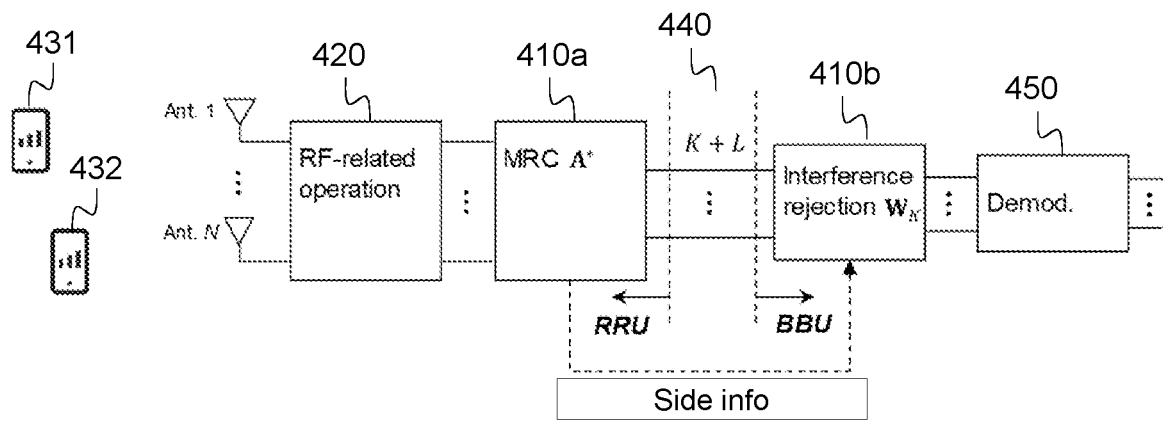
FIG. 7 is a schematic block diagram of another type of split of functionalities between the RRU and the BBU, according to embodiments of the invention.

FIG. 6 describes a solution in a similar architecture as in FIG. 5, with like numerals referring to like functionality, but where the IRC processing functionality 410 has been moved from the BBU to the RRU. Here the required FH streams can be reduced to K, which is the number of user layers. However, the term in the parenthesis of Equation (1) is an N×N matrix. The inversion of the N×N matrix drives up the complexity exponentially to the size of the matrix. The increased complexity will drive up cost, power consumption and weight of the RRU.

To be able to have a less complex RRU and still to keep the necessary fronthaul capacity limited, embodiments of this invention proposes a functional split between the RRU and the BBU to implement the IRC algorithm in two phases, given the interference-covariance estimation matrix. Such a functional split is described in FIG. 6 in a similar architecture as in FIG. 4, with like numerals referring to like functionality. A first 410a of the two phases of the IRC computation functionality is performed in the RRU. The first IRC computation functionality phase 410a performs simple processing, e.g. MRC, to largely reduce the required FH streams while maintaining sufficient signal information and degrees of freedom for further processing in the BBU. The second 410b of the two phases carries out interference rejection on the processed signal from the RRU. The second functionality phase 410b is placed in the BBU. FIG. 6 also illustrates that side information, such as information of an extended matrix A or A*A is sent over the fronthaul link 440 to the BBU. More details about the side information and of the extended matrix A will be described later.

In the following, an embodiment of a method is shown that first mathematically transforms IRC processing into a formulation of ZF processing. Then the formulated ZF processing is decomposed into two parts, wherein the first part is performed in the RRU and the second part is performed in the BBU. This reduces RRU complexity as well as reduces the number of fronthaul streams compared to the CPRI case.

Figure 8:
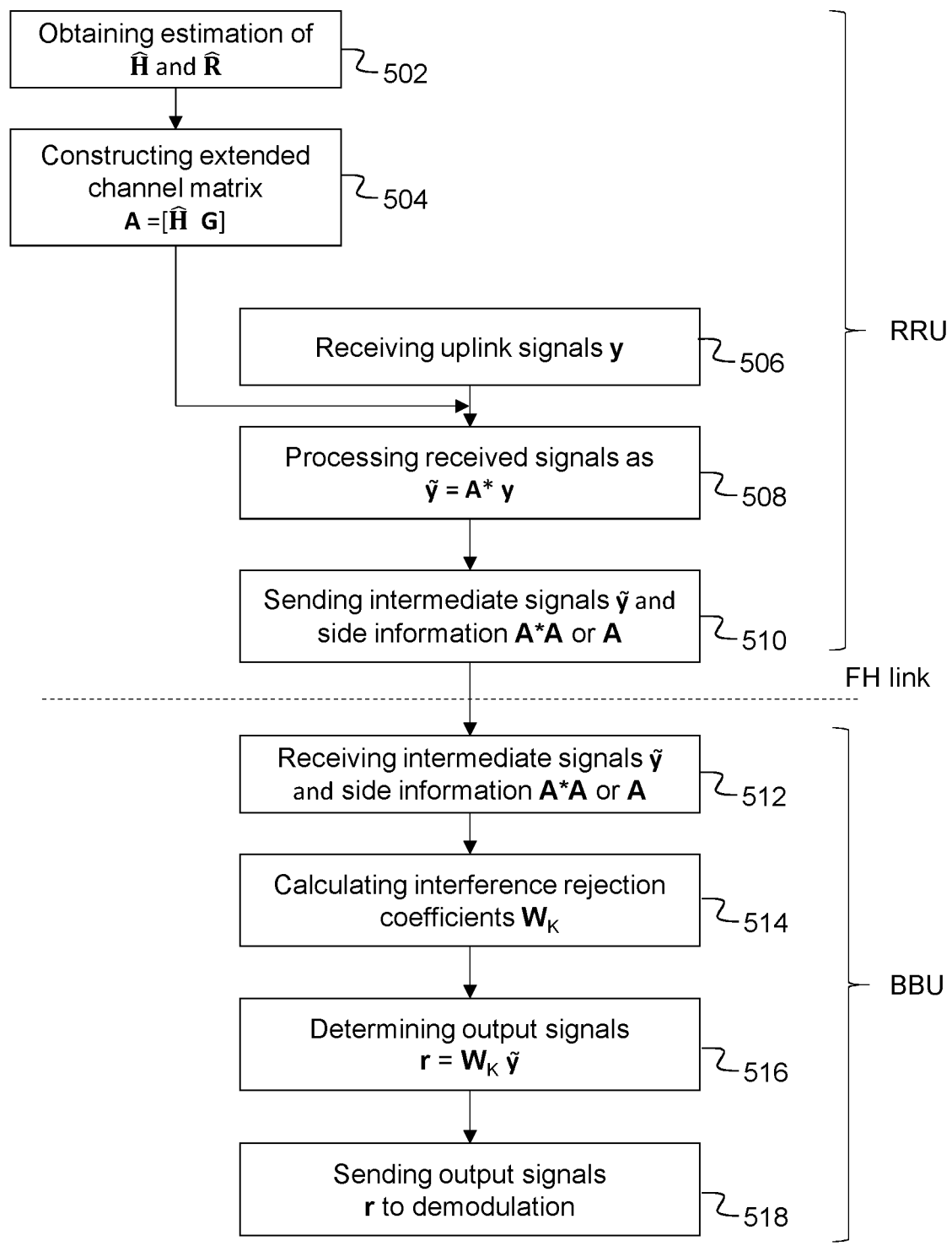
FIG. 8 is a flow chart illustrating a method for handling uplink signals in a distributed base station system with a functional split such as in FIG. 7, according to possible embodiments.

FIG. 8 shows the main steps of this embodiment. The first part performed in the RRU comprises steps 502, 504, 506, 508 and 510 whereas the second part performed in the BBU comprises steps 512, 514, 516 and 518. The method starts by the RRU obtaining 502 the channel estimation matrix $\hat{H}$ and the interference covariance matrix $\hat{R}$. The interference covariance matrix may be obtained by being determined based on the obtained channel estimation matrix $\hat{H}$ and on other channel information different from the channel estimation matrix. Thereafter, the RRU constructs 504 an extended channel matrix A, which is based on the channel estimation matrix $\hat{H}$ and the interference-covariance estimation matrix $\hat{R}$ as $$A=[\hat{H}G] \quad (2)$$

where the extended part matrix of the extended channel matrix, $G \in \mathbb{C}^{N \times L}$, is obtained from the decomposition of $\hat{R}$, as $\hat{R} \approx GG^*$. One example of obtaining the extended part matrix G is based on eigenvalue decomposition and will be described further down in this document. The number of columns of the extended part matrix G, denoted as L, should be smaller than N−K to be able to save FH capacity.

The received uplink signals y are then processed 508 by being multiplied with the Hermitian transpose of the extended channel matrix A* in the RRU, which can be interpreted as applying an MRC operation with respect to the extended channel A. The processing results in the intermediate signals $\tilde{y}=A^*y$ described as $\tilde{y}=[\tilde{y}_1, \tilde{y}_2, \ldots, \tilde{y}_l, \ldots, \tilde{y}_{K+L}]^T$, where $\tilde{y}_l$ is the signal to be transmitted on the l-th fronthaul stream. Comparing to the originally received uplink signals y which generate N fronthaul streams, this operation reduces the data traffic to K+L fronthaul streams. Then the RRU sends 510 the intermediate signals $\tilde{y}$ to the BBU over the fronthaul link. In addition, the RRU also sends 510 side information comprising information on the channel estimation matrix $\hat{H}$ and on the interference covariance estimation matrix $\hat{R}$ to the BBU. The side information that is sent to the BBU may be the (K+L)×(K+L) coefficients of an intermediate matrix A*A. Alternatively, the side information may be the N×(K+L) coefficients of the extended channel matrix A. Preferably, the coefficients of the intermediate matrix A*A should be sent, as the number of coefficients are fewer than the number of coefficients of the extended channel matrix A, though one matrix multiplication needs to be done in the RRU before sending this side information. Here the additional degrees of freedom L is supposed to be in the range of 1≤L<N−K. If L>N−K, it will not save the FH capacity. If L=0, the IRC method becomes the MMSE method, as no covariance information is incorporated then.

In the BBU, the intermediate signals $\tilde{y}$ and the side information are received 512. Then the interference rejection/mitigation is conducted in the BBU. To achieve this, beamforming coefficients of a beamforming matrix are calculated 514. In this embodiment those are called interference rejection coefficients of an interference rejection matrix $W_K$ as this is what the beamforming intends to achieve, i.e. to reject/mitigate interferences. The interference rejection coefficients are calculated as the first K rows of $(A^*A)^{-1}$. The received intermediate signals $\tilde{y}$ from the fronthaul interface are multiplied by the interference rejection matrix $W_K$, where $W_K$ equals the first K rows of $(A^*A)^{-1}$.

Output signals r, which are estimations of the K user-layer signals sent by the UEs, are determined 516 by multiplying the intermediate signals $\tilde{y}$ with the interference rejection coefficients of the interference rejection matrix $W_K$, i.e., $r=W_K\tilde{y}=W_KA^*y$. Further down it will be shown that $W_KA^*=W_{IRC}$. Further, the output signals r are sent 518 for further processing in the BBU or in another node. The further processing may be demodulation.

Figure 9:
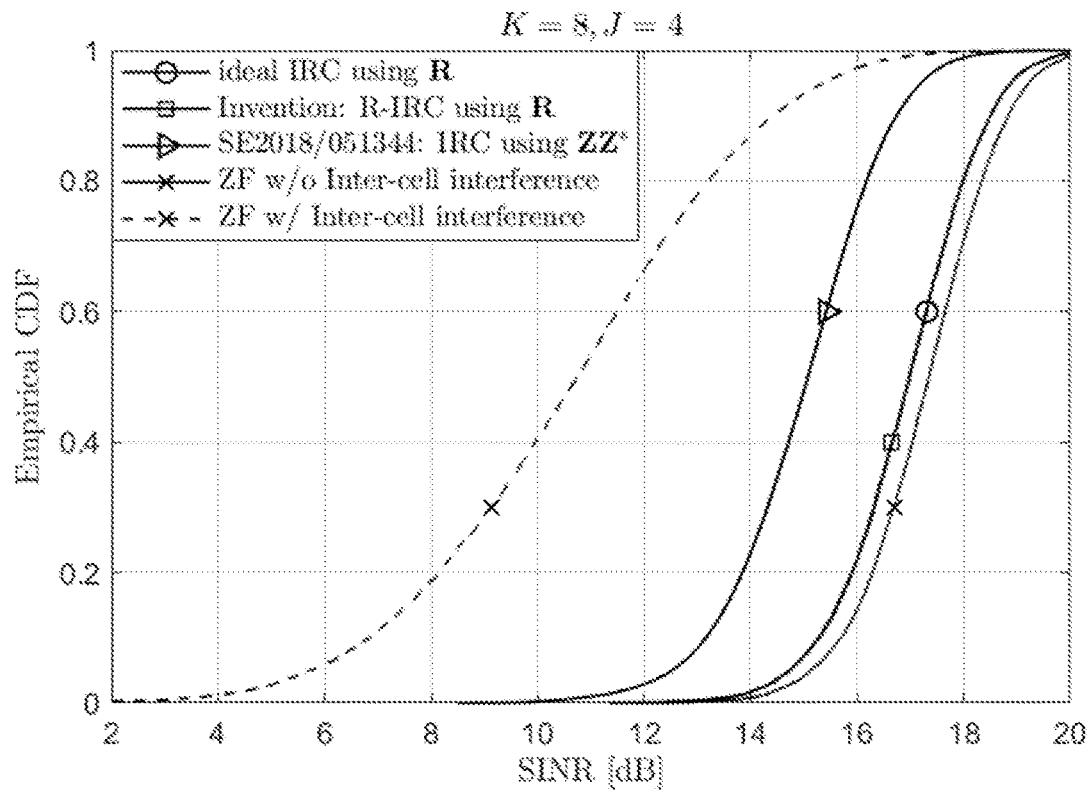
FIG. 9 is a Cartesian coordinate diagram showing SINR distribution for simulations of prior art with and without interference compared to different embodiments of the invention with interference mitigated.
Figure 10:
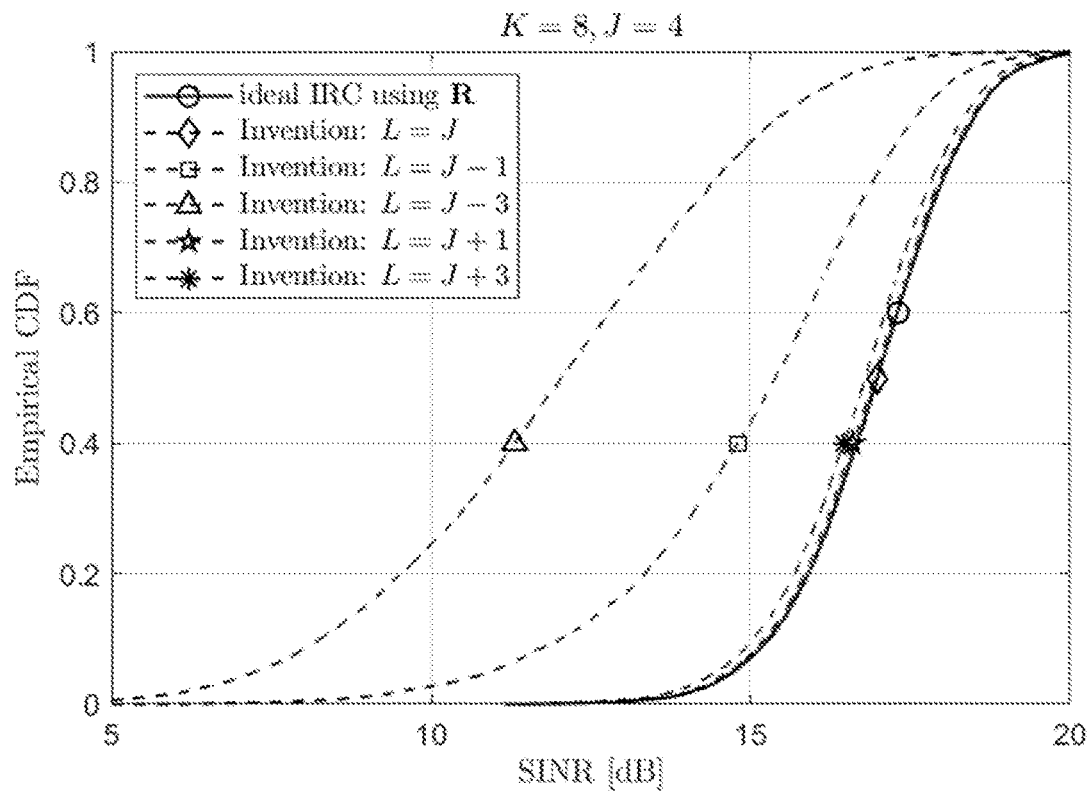
FIG. 10 is a Cartesian coordinate diagram showing SINR distribution for simulations of different embodiments of the invention.

FIGS. 9 and 10 show results of simulation performed. The simulations assume perfect channel state information (CSI) available in the direction domain. Other simulation setup is listed below:

Base station: 64-element uniform linear array with half wavelength spacing and each element is omni-directional.

UEs: 8 UEs with one antenna each. Therefore, 8 user-layers in total where each UE has one layer.

Multipath channel: The channel is modeled from the RRU perspective with 5 multipath clusters, each of which has 1 Line Of Sight (LOS) component representing the strong component in the cluster and 5 other multipath components in each cluster.
 a. The amplitude of each component is Rayleigh distributed and the phase is uniformed distributed in [−pi, pi]. The multipath component has 5-10 dB lower power than the LOS. The power offset is uniformly distributed in [5 10] dB.
 b. The angle of departure (AoD) of the LOS component is uniformly distribute in [−60, 60] degrees, assuming covering a 120-degree cell sector. The multipath components with angular spread of 5 degrees in each cluster with a uniform distribution in [−2.5, 2.5] degrees around the LOS AoD.

Received SNR per transmit antenna element: 0 dB.

The channel SIR is 0 dB.

The simulations are done with a direction-domain implementation with a 64-point Digital Fourier Transform (DFT), i.e. Fast Fourier Transform (FFT) generating 64 fixed directions. Directions sometimes are also referred to as beams, and direction-domain is sometimes also referred to as beam-domain.

FIG. 9 shows SINR for different use cases: when IRC is used to estimate R in the ideal case; when the present invention is used for estimating R (present invention is called "Invention" in FIGS. 9 and 10); when the method presented in PCT/SE2018/051344 is used; when ZF is used and there is no inter-cell interference present; and when ZF is used with inter-cell interference present (this is the case when no compensation is made for the interferers). In particular, it can be seen in FIG. 9 that the ZF without inter-cell interference presents as the best performance since the intra-cell interference is mitigated and there is no inter-cell interference present in this simulation. The ZF with inter-cell interference presents as a lower-bound since there is inter-cell interference present but the ZF equalizer does not take the inter-cell interference into account. The ideal IRC, which performs as in formula (1), when both the interference channel and the noise variance are known, performs quite close to the ZF-without-inter-cell-interference case, which means that both inter-and-intra-cell interference are effectively mitigated. The method of PCT/SE2018/051344 is simulated with 12 reference signals for obtaining the interference-and-noise samples. A noticeable performance degradation is observed comparing to the ideal IRC case. Given perfect knowledge of the interference-covariance matrix R, the method proposed in this invention performs almost the same as the ideal IRC case even if the matrix G only contains L=J=4 columns.

FIG. 10 shows a SINR Cumulative Distribution Function (CDF) comparison with different number of largest eigenvalues selected, and where the number of interferences J is 4. The simulations shown in FIG. 10 further investigate how the number of selected columns L in the extended part matrix G impact on performances. It shows that the best is to select L as the same number as the number of interferences J. Using a number more than J will slightly degrade the performance due to the extra noise components included. Also, it increases the number of FH streams for data transport. The performance will be largely degraded if the selected number of L is smaller than J, because some of the principal components which include necessary interference information are ignored.

In the following it is explained how the extended part matrix G can be determined using Eigenvalue decomposition (EVD). The EVD of $\hat{R}$ is expressed as $$\hat{R} = Q\Sigma Q^{-1} = Q\Sigma^{1/2}\Sigma^{1/2}Q^*,$$

where Q is the N×N eigenvector matrix and $\Sigma$ is the diagonal matrix whose diagonal elements are the eigenvalues. Only L strongest eigenvalues and the corresponding eigenvectors are used, while the rest are removed. In this way, we obtain a dimension-reduced matrix $$G = Q_L \Sigma_L^{1/2},$$

where $\Sigma_L$ denotes a L×L diagonal matrix composed by the largest L eigenvalues, and $Q_L$ is composed by L eigenvectors corresponding to the L largest eigenvalues. If the dominant eigenvalues are included, the approximation is valid that $\hat{R} \approx GG^*$. Regarding the determination of L, it can be fixed and configured according to prior knowledge regarding the number of strongest interferers from e.g. field trials and measurements. It can be also done dynamically. For example, L can change according to the available FH capacity which can change dynamically if the FH traffic go through a switching network. If the actual number of interferences is smaller than the initial value of L, this will be reflected from the strengths of eigenvalues. In this case, L can be reduced according to the eigenvalues calculated to reduce the number of FH streams. Regarding the complexity of such EVD operation, using a principal component analysis (PCA)-based method, such as described in the document "Recursive updating the eigenvalue decomposition of a covariance matrix" by K.-B. Yu published in IEEE Transaction on Signal Processing, vol. 39, no. 5, pp. 1136-1145, May 1991, and in the document "CS168: The Modern Algorithmic Toolbox, Lecture #8: How PCA Works" by T. Roughgarden and G. Valiant, to obtain the dimension-reduced matrix G, the complexity is reduced to the scale of $O(N^2L)$ comparing to the complexity $O(N^3)$ of conducting N×N matrix inversion required by full IRC operation in the RRU. In practice, the number of interferences will be much smaller than N, and the complexity saving will be significant in the RRU as L will be much smaller than N.

The IRC formula described in equation (2) may be approximated according to the following. Regarding the extended channel A as in Equation (2), a (K+L)×N auxiliary ZF equalizer is defined as $$W_{zf} = (A^*A)^{-1}A^* = (A^*A)^{-1}\begin{bmatrix} \hat{H}^* \\ G^* \end{bmatrix} \quad (3)$$

Let $\Lambda_K$ denote the first K rows of an (K+L)×(K+L) identity matrix. Let $W_{zf,K}$ denote the first K rows of $W_{zf}$, i.e., $W_{zf,K} = \Lambda_K W_{zf}$. It can then be shown equivalently that $$W_{zf,K} = \hat{H}^*(AA^*)^{-1} = \hat{H}(\hat{H}\hat{H}^* + GG^*)^{-1} \approx \hat{H}^*(\hat{H}\hat{H}^* + \hat{R})^{-1} = W_{IRC} \quad (4)$$

Also, $Wzf,K$ in Equation (4) can be expressed as $$W_{zf,K} = \Lambda_K W_{zf} = \Lambda_K (A^*A)^{-1}A^* = W_K A^*$$

where $W_K = \Lambda_K(A^*A)^{-1}$ is composed by the first K rows of $(A^*A)^{-1}$. Therefore, $W_{IRC} = W_K A^*$, which indicates that IRC can be implemented by applying $A^*$ in the RRU and $W_K$ in the BBU.

According to an embodiment, complexity in the BBU can be reduced via block matrix inversion for $W_K$ calculation. As shown previously, $W_K$ equals the first K rows of $(A^*A)^{-1}$. Below it is shown that the direct calculation of $(A^*A)^{-1}$ can be avoided to obtain $W_K$. Note that $A^*A$ is composed by four block matrices as $$A^*A = \begin{bmatrix} B & D \\ C & E \end{bmatrix},$$

where B is a K×K block matrix, C is a L×K block matrix, D is a K×L block matrix and E is a L×L block matrix. According to the block matrix inversion property, the first K rows of $(A^*A)^{-1}$ can be derived as $$W_K = [(B-DE^{-1}C)^{-1} -(B-DE^{-1}C)^{-1}DE^{-1}] \quad (5)$$

In this way, the complexity is reduced for calculating $W_K$, as it is only necessary to calculate one L×L matrix inversion and one K×K matrix inversion. The complexity is lower than calculating the inversion of a (K+L)×(K+L) matrix.

Figure 11:
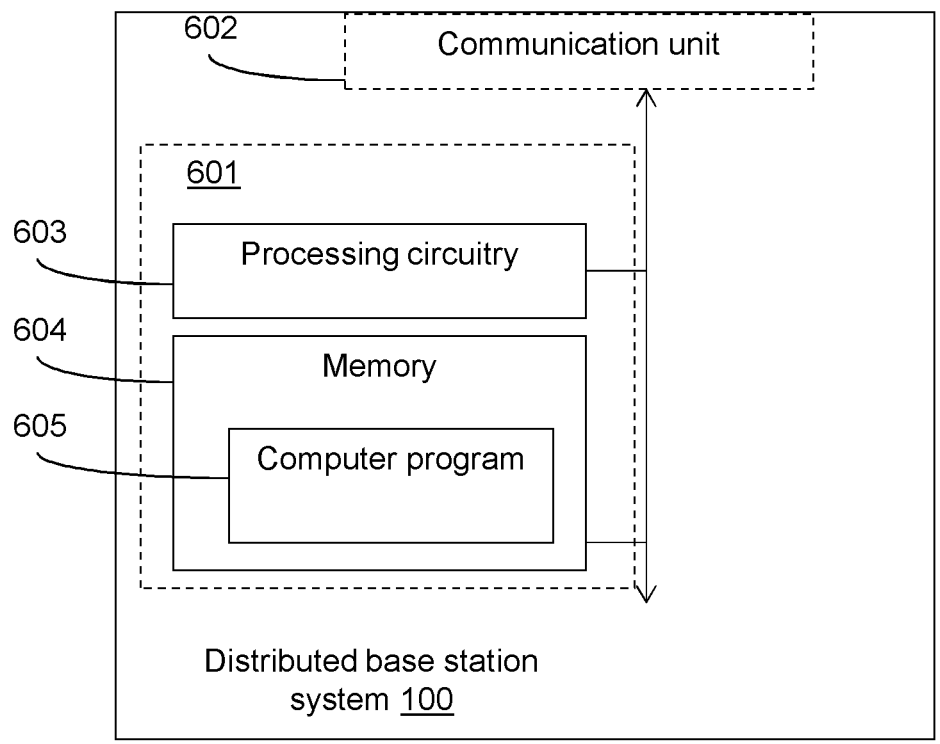
FIG. 11 is a block diagram illustrating a distributed base station system in more detail, according to further possible embodiments.

FIG. 11, in conjunction with FIG. 1, illustrates a distributed base station system 100 operable in a wireless communication network. The distributed base station system 100 comprises a BBU 110 and an RRU 120 connected to the BBU over a fronthaul link 140. The RRU 120 is connected to N antennas 121, 122, 123. The distributed base station system 100 comprises a processing circuitry 603 and a memory 604. Said memory contains instructions executable by said processing circuitry, whereby the distributed base station system 100 is operative for obtaining, by the RRU, uplink signals y as received at the N antennas 121, 122, 123 from a number of UEs 131, 132, 133, wirelessly connected to the RRU 120, the N uplink signals comprising K user-layer signals overlaid with J interference signals and noise, and obtaining, by the RRU, a channel estimation matrix $\hat{H}$ of wireless communication channels H between the number UEs 131, 132, 133 and the N antennas 121, 122, 123 from reference signals $y_{ref,l}$ as received at the N antennas from the number of UEs. Further, the distributed base station system 100 is operative for determining, by the RRU, an interference covariance estimation matrix $\hat{R}$ based on the obtained channel estimation matrix $\hat{H}$ and on other channel information different from the channel estimation matrix, and sending, by the RRU, information on the channel estimation matrix $\hat{H}$ and on the interference covariance estimation matrix $\hat{R}$ over the fronthaul link to the BBU 110. Further, the distributed base station system 100 is operative for determining, by the RRU, intermediate signals $\tilde{y}$, based on the uplink signals y, the channel estimation matrix $\hat{H}$ and the interference covariance estimation matrix $\hat{R}$, the intermediate signals having K+L components, where (K+L) is smaller than N, and L is larger than zero, and sending, by the RRU, the determined intermediate signals $\tilde{y}$ over the fronthaul link to the BBU 110. Further, the distributed base station system 100 is operative for determining, by the BBU, a beamforming matrix $W_K$ based on the information sent by the RRU on the channel estimation matrix $\hat{H}$ and on the interference covariance estimation matrix $\hat{R}$, and determining, by the BBU, output signals r, which are estimations of the K user-layer signals, by multiplying the intermediate signals $\tilde{y}$ sent by the RRU with beamforming weights of the beamforming matrix $W_K$.

According to other embodiments, the distributed base station system 100 may further comprise a communication unit 602, which may be considered to comprise conventional means for wireless communication with the wireless communication devices 131, 132, 133, such as a transceiver for wireless transmission and reception of signals. The communication unit 602 may also comprise conventional means for communication with other radio access network nodes of the wireless communication network 100 and with the core network 150. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the distributed base station system 100 to perform the steps described in any of the described embodiments of the distributed base station system 100 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity to which the distributed base station system 100 has access via the communication unit 602. The computer program 605 may then be downloaded from the server into the memory 604.

Figure 12:
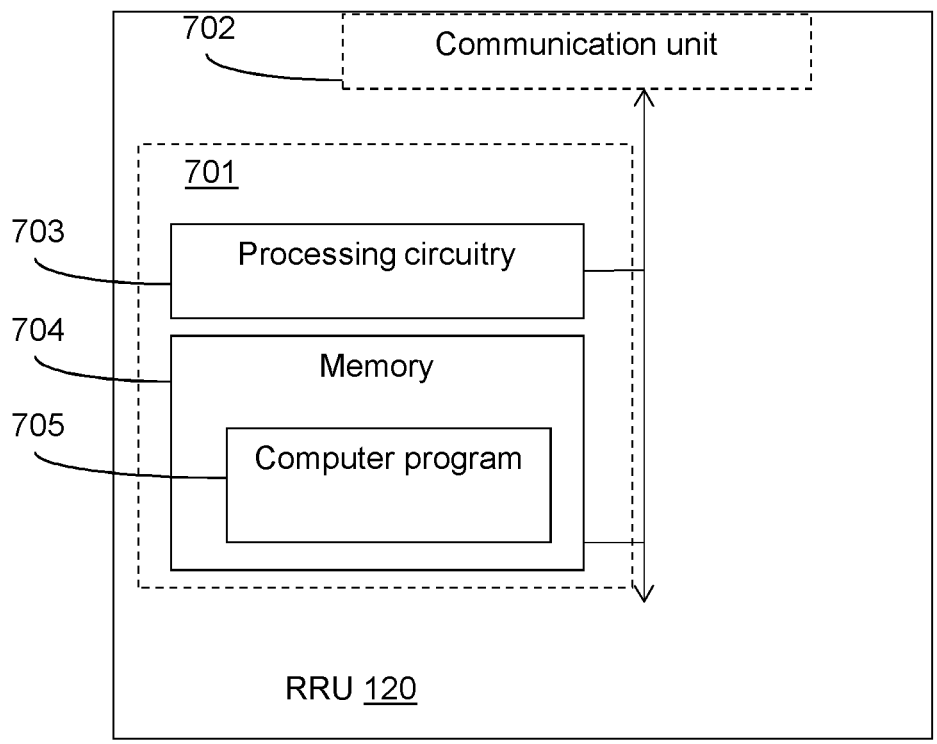
FIG. 12 is a block diagram illustrating an RRU in more detail, according to further possible embodiments.

FIG. 12, in conjunction with FIG. 1, describes an RRU 120 operable in a distributed base station system 100 of a wireless communication network. The distributed base station system 100 further comprises a BBU 110 connected to the RRU over a fronthaul link. The RRU 120 is operable to be connected to N antennas 121, 122, 123. The RRU 120 comprises a processing circuitry 703 and a memory 704. Said memory contains instructions executable by said processing circuitry, whereby the RRU 120 is operative for obtaining uplink signals y as received at the N antennas 121, 122, 123 from a number of UEs 131, 132, 133 wirelessly connected to the RRU 120, the uplink signals comprising K user-layer signals overlaid with J interference signals and noise, and obtaining a channel estimation matrix $\hat{H}$ of wireless communication channels H between the number UEs 131, 132, 133 and the N antennas 121, 122, 123 from reference signals $y_{ref,l}$ as received at the N antennas from the number of UEs. Further, the RRU 120 is operative for determining an interference covariance estimation matrix $\hat{R}$ based on the obtained channel estimation matrix $\hat{H}$ and on other channel information different from the channel estimation matrix, and sending information on the channel estimation matrix $\hat{H}$ and on the interference covariance estimation matrix $\hat{R}$ over the fronthaul link to the BBU 110. Further, the RRU 120 is operative for determining intermediate signals $\tilde{y}$, based on the uplink signals y, the channel estimation matrix $\hat{H}$ and the interference covariance estimation matrix $\hat{R}$, the intermediate signals having K+L components, where (K+L) is smaller than N, and K is larger than zero, and sending to the BBU 110 over the fronthaul link 140, the determined intermediate signals $\tilde{y}$.

According to an embodiment, the other channel information is downlink channel feedback received by the RRU from the number of UEs.

According to another embodiment, the other channel information is uplink channel quality information.

According to another embodiment, the RRU 120 is operable for determining the intermediate signals $\tilde{y}$ by multiplying the received incoming signal y with the transpose and conjugate A* of an extended channel matrix A, which is obtained based on the channel estimation matrix $\hat{H}$ and on the interference covariance estimation matrix $\hat{R}$.

According to another embodiment, the extended channel matrix A comprises the channel estimation matrix $\hat{H}$ and an intermediate matrix G. Further, the RRU 120 is operable to obtain the intermediate matrix G from a decomposition of the interference covariance estimation matrix $\hat{R}$, wherein $\hat{R}$ is approximated as GG*.

According to another embodiment, the RRU 120 is operable for sending the information on the channel estimation matrix $\hat{H}$ and the interference covariance estimation matrix $\hat{R}$ over the fronthaul link by sending information on the extended channel matrix A.

According to other embodiments, the RRU 120 may further comprise a communication unit 702, which may be considered to comprise conventional means for wireless communication with the wireless communication devices 131, 132, 133, such as a transceiver for wireless transmission and reception of signals. The communication unit 702 may also comprise conventional means for communication with the BBU 110 over the fronthaul link 140. The instructions executable by said processing circuitry 703 may be arranged as a computer program 705 stored e.g. in said memory 704. The processing circuitry 703 and the memory 704 may be arranged in a sub-arrangement 701. The sub-arrangement 701 may be a micro-processor and adequate software and storage therefore, a Programmable Logic Device, PLD, or other electronic component(s)/processing circuit(s) configured to perform the methods mentioned above. The processing circuitry 703 may comprise one or more programmable processor, application-specific integrated circuits, field programmable gate arrays or combinations of these adapted to execute instructions.

The computer program 705 may be arranged such that when its instructions are run in the processing circuitry, they cause the RRU 120 to perform the steps described in any of the described embodiments of the RRU 120 and its method. The computer program 705 may be carried by a computer program product connectable to the processing circuitry 703. The computer program product may be the memory 704, or at least arranged in the memory. The memory 704 may be realized as for example a RAM (Random-access memory), ROM (Read-Only Memory) or an EEPROM (Electrical Erasable Programmable ROM). Further, the computer program 705 may be carried by a separate computer-readable medium, such as a CD, DVD or flash memory, from which the program could be downloaded into the memory 704. Alternatively, the computer program may be stored on a server or any other entity to which the RRU 120 has access via the communication unit 702. The computer program 705 may then be downloaded from the server into the memory 704.

Figure 13:
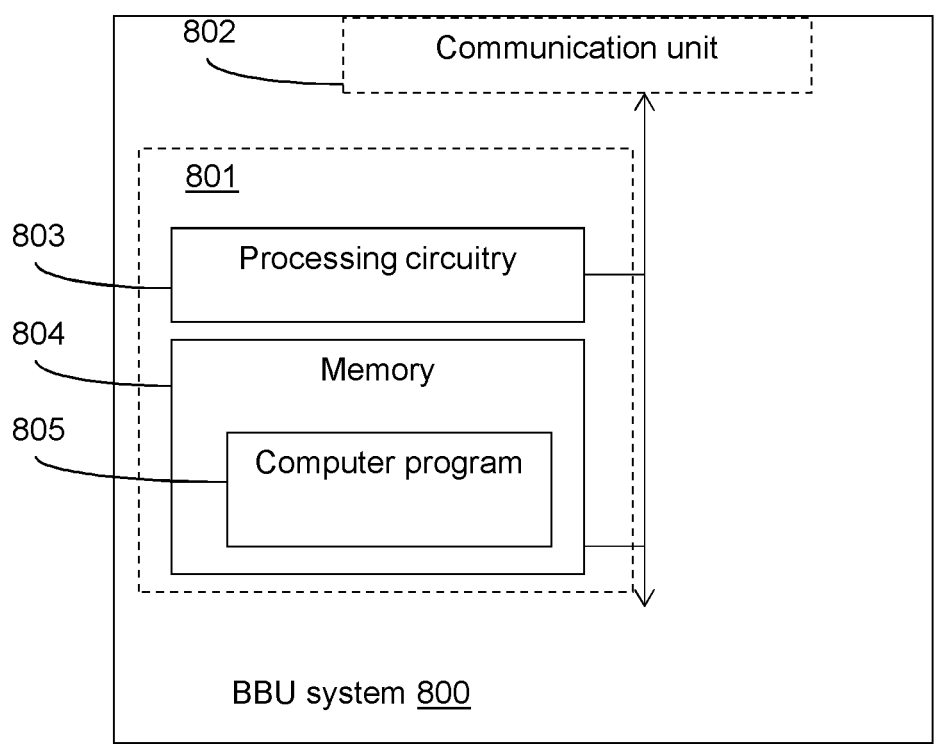
FIG. 13 is a block diagram illustrating a BBU system in more detail, according to further possible embodiments.

FIG. 13, in conjunction with FIG. 1, describes a BBU system 800 operable in a wireless communication network. The wireless communication network comprises a distributed base station system 100 having a BBU 110 and an RRU 120 connected to the BBU over a front haul connection. The RRU has N antennas 121, 122, 123. The BBU system 800 comprises a processing circuitry 803 and a memory 804. Said memory contains instructions executable by said processing circuitry, whereby the BBU system 800 is operative for receiving, from the RRU 120, a plurality of intermediate signals ŷ with K+L components, where (K+L) is smaller than N, determined by the RRU based on a channel estimation matrix Ĥ, on an interference covariance estimation matrix R̂ determined based on the channel estimation matrix Ĥ and on other channel information different from the channel estimation matrix, and on uplink signals y with N components as received by the N antennas 121, 122, 123 from a number of UEs 131, 132, 133, the uplink signals y comprising K user-layer signals overlaid with J interference signals and noise. Further, the BBU system 800 is operative for receiving, from the RRU 120, information on the channel estimation matrix Ĥ and on the interference covariance estimation matrix R̂, determining a beamforming matrix $W_K$ based on the received information on the channel estimation matrix Ĥ and on the interference covariance estimation matrix R̂, and determining output signals r, which are an estimation of the K user-layer signals, by multiplying the intermediate signals ŷ with beamforming weights of the beamforming matrix $W_K$.

The BBU system may be the actual BBU 110, or at least a part of the BBU 110. Alternatively, the BBU system may be any other network node of the wireless communication network, such as a node further away from the UE, e.g. another network element in the RAN or close to the RAN or another RAN node. In this alternative, the BBU 110 receives from the RRU 120, the intermediate signals y, and communicates the intermediate signals to the other network node. Alternatively, the BBU system may be a group of network nodes, wherein BBU system functionality is spread out over different physical, or virtual, nodes of the network. The latter may be called a "cloud-solution".

According to an embodiment, the BBU system 800 is operable for determining the beamforming matrix $W_K$ as the first K rows of $(A*A)^{-1}$, where A is an extended channel matrix, which is obtained based on the channel estimation matrix Ĥ and on the interference covariance estimation matrix R̂, and A* is the transpose and conjugate of the extended channel matrix A.

According to another embodiment, the extended channel matrix A comprises the channel estimation matrix Ĥ and an intermediate matrix G. Further, the BBU system is operable for obtaining the intermediate matrix G from a decomposition of the interference covariance estimation matrix R̂, wherein R̂ is approximated as GG*.

According to another embodiment, the BBU system 800 is operable for receiving the information on the channel estimation matrix Ĥ and the interference covariance estimation matrix R̂ from the RRU over the fronthaul link by receiving information on the extended channel matrix A.

According to another embodiment, the received information on the channel estimation matrix Ĥ and on the interference covariance estimation matrix R̂ contains ingredients from the channel estimation matrix Ĥ and information on the other channel information different from the channel estimation matrix.

According to other embodiments, the BBU system 800 may further comprise a communication unit 802, which may be considered to comprise conventional means for communication with the RRU 120 over the fronthaul link 140 and for communication with other nodes 150 of the wireless communication network. The instructions executable by said processing circuitry 803 may be arranged as a computer program 805 stored e.g. in said memory 804. The processing circuitry 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the methods mentioned above. The processing circuitry 803 may comprise one or more programmable processor, application-specific integrated circuits, field programmable gate arrays or combinations of these adapted to execute instructions.

The computer program 805 may be arranged such that when its instructions are run in the processing circuitry, they cause the BBU system 800 to perform the steps described in any of the described embodiments of the BBU system 800 and its method. The computer program 805 may be carried by a computer program product connectable to the processing circuitry 803. The computer program product may be the memory 804, or at least arranged in the memory. The memory 804 may be realized as for example a RAM (Random-access memory), ROM (Read-Only Memory) or an EEPROM (Electrical Erasable Programmable ROM). Further, the computer program 805 may be carried by a separate computer-readable medium, such as a CD, DVD or flash memory, from which the program could be downloaded into the memory 804. Alternatively, the computer program may be stored on a server or any other entity to which the BBU system 800 has access via the communication unit 802. The computer program 805 may then be downloaded from the server into the memory 804.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a Remote Radio Unit, RRU, of a distributed base station system of a wireless communication network, the distributed base station system further comprising a Base Band Unit, BBU, connected to the RRU over a fronthaul link, the RRU being connected to N antennas, the method comprising:
    obtaining uplink signals y as received at the N antennas from a number of UEs wirelessly connected to the RRU, the uplink signals comprising K user-layer signals overlaid with J interference signals and noise;
    obtaining a channel estimation matrix Ĥ of wireless communication channels H between the number UEs and the N antennas from reference signals $y_{ref,l}$ as received at the N antennas from the number of UEs;

determining an interference covariance estimation matrix $\hat{R}$ based on the obtained channel estimation matrix $\hat{H}$ and on other channel information different from the channel estimation matrix;

sending information on the channel estimation matrix $\hat{H}$ and on the interference covariance estimation matrix $\hat{R}$ over the fronthaul link to the BBU;

determining intermediate signals $\tilde{y}$, based on the uplink signals y, the channel estimation matrix $\hat{H}$ and the interference covariance estimation matrix $\hat{R}$, the intermediate signals having K+L components, where (K+L) is smaller than N, and L is larger than zero and L is a number of fronthaul streams transported via the fronthaul link additional to K, and sending to the BBU over the fronthaul link, the determined intermediate signals $\tilde{y}$.

2. The method according to claim 1, wherein the other channel information is downlink channel feedback received by the RRU from the number of UEs.

3. The method according to claim 1, wherein the other channel information is uplink channel quality information.

4. The method according to claim 1, wherein the determining of the intermediate signals $\tilde{y}$ comprises multiplying the received incoming signal y with the transpose and conjugate $A^*$ of an extended channel matrix A, which is obtained based on the channel estimation matrix $\hat{H}$ and on the interference covariance estimation matrix $\hat{R}$.

5. The method according to claim 4, wherein the extended channel matrix A comprises the channel estimation matrix $\hat{H}$ and an intermediate matrix G, wherein the intermediate matrix G is obtained from a decomposition of the interference covariance estimation matrix $\hat{R}$, wherein $\hat{R}$ is approximated as $GG^*$.

6. The method according to claim 5, wherein the intermediate matrix G is obtained based on an eigenvalue decomposition of the interference covariance estimation matrix $\hat{R}$.

7. The method according to claim 4, wherein the information on the channel estimation matrix $\hat{H}$ and the interference covariance estimation matrix $\hat{R}$ sent over the fronthaul link is information on the extended channel matrix A.

8. A method performed by a Base Band Unit, BBU, system of a wireless communication network, the wireless communication network comprising a distributed base station system having a BBU and a Remote Radio Unit, RRU, connected to the BBU over a fronthaul link, the RRU having N antennas, the method comprising:

receiving, from the RRU, a plurality of intermediate signals $\tilde{y}$ with K+L components, where (K+L) is smaller than N, determined by the RRU based on a channel estimation matrix $\hat{H}$, on an interference covariance estimation matrix $\hat{R}$ determined based on the channel estimation matrix $\hat{H}$ and on other channel information different from the channel estimation matrix, and on uplink signals y with N components as received by the N antennas from a number of UEs, the uplink signals y comprising K user-layer signals overlaid with J interference signals and noise, where L is a number of fronthaul streams transported via the fronthaul link additional to K;

receiving, from the RRU, information on the channel estimation matrix $\hat{H}$ and on the interference covariance estimation matrix $\hat{R}$;

determining a beamforming matrix $W_K$ based on the received information on the channel estimation matrix $\hat{H}$ and on the interference covariance estimation matrix $\hat{R}$, and determining output signals r, which are an estimation of the K user-layer signals, by multiplying the intermediate signals $\tilde{y}$ with beamforming weights of the beamforming matrix $W_K$.

9. The method according to claim 8, wherein the beamforming matrix $W_K$ is determined as the first K rows of $(A^*A)^{-1}$, where A is an extended channel matrix, which is obtained based on the channel estimation matrix $\hat{H}$ and on the interference covariance estimation matrix $\hat{R}$, and $A^*$ is the transpose and conjugate of the extended channel matrix A.

10. The method according to claim 9, wherein the information on the channel estimation matrix $\hat{H}$ and the interference covariance estimation matrix $\hat{R}$ received from the RRU over the fronthaul link is information on the extended channel matrix A.

11. The method according to claim 8, wherein the received information on the channel estimation matrix $\hat{H}$ and on the interference covariance estimation matrix $\hat{R}$, contains ingredients from the channel estimation matrix $\hat{H}$ and information on the other channel information different from the channel estimation matrix.

12. A Remote Radio Unit, RRU, operable in a distributed base station system of a wireless communication network, the distributed base station system further comprising a base band unit, BBU, connected to the RRU over a fronthaul link, the RRU being operable to be connected to N antennas, the RRU comprising a processing circuitry and a memory, said memory containing instructions executable by said processing circuitry, whereby the RRU is operative for:

obtaining uplink signals y as received at the N antennas from a number of User Equipment (UEs) wireles sly connected to the RRU, the uplink signals comprising K user-layer signals overlaid with J interference signals and noise;

obtaining a channel estimation matrix $\hat{H}$ of wireless communication channels H between the number UEs and the N antennas from reference signals $y_{ref,l}$ as received at the N antennas from the number of UEs;

determining an interference covariance estimation matrix $\hat{R}$ based on the obtained channel estimation matrix $\hat{H}$ and on other channel information different from the channel estimation matrix;

sending information on the channel estimation matrix $\hat{H}$ and on the interference covariance estimation matrix $\hat{R}$ over the fronthaul link to the BBU;

determining intermediate signals $\tilde{y}$, based on the uplink signals y, the channel estimation matrix $\hat{H}$ and the interference covariance estimation matrix $\hat{R}$, the intermediate signals having K+L components, where (K+L) is smaller than N, and L is larger than zero and L is a number of fronthaul streams transported via the fronthaul link additional to K, and sending to the BBU over the fronthaul link, the determined intermediate signals $\tilde{y}$.

13. The RRU according to claim 12, wherein the other channel information is downlink channel feedback received by the RRU from the number of UEs.

14. The RRU according to claim 12, wherein the other channel information is uplink channel quality information.

15. The RRU according to claim 12, operable for determining the intermediate signals $\tilde{y}$ by multiplying the received incoming signal y with the transpose and conjugate $A^*$ of an extended channel matrix A, which is obtained based on the channel estimation matrix $\hat{H}$ and on the interference covariance estimation matrix $\hat{R}$.

16. The RRU according to claim 15, wherein the extended channel matrix A comprises the channel estimation matrix $\hat{H}$ and an intermediate matrix G, and wherein RRU is operable to obtain the intermediate matrix G from a decomposition of the interference covariance estimation matrix $\hat{R}$, wherein $\hat{R}$ is approximated as GG*.

17. A Base Band Unit, BBU, system operable in a wireless communication network, the wireless communication network comprising a distributed base station system having a BBU and a Remote Radio Unit, RRU, connected to the BBU over a front haul connection, the RRU having N antennas, the BBU system comprising a processing circuitry and a memory, said memory containing instructions executable by said processing circuitry, whereby the BBU system is operative for:
- receiving, from the RRU, a plurality of intermediate signals $\tilde{y}$ with K+L components, where (K+L) is smaller than N, determined by the RRU based on a channel estimation matrix $\hat{H}$, on an interference covariance estimation matrix $\hat{R}$ determined based on the channel estimation matrix $\hat{H}$ and on other channel information different from the channel estimation matrix, and on uplink signals y with N components as received by the N antennas from a number of UEs, the uplink signals y comprising K user-layer signals overlaid with J interference signals and noise, where L is a number of fronthaul streams transported via the fronthaul link additional to K;
- receiving, from the RRU, information on the channel estimation matrix $\hat{H}$ and on the interference covariance estimation matrix $\hat{R}$;
- determining a beamforming matrix $W_K$ based on the received information on the channel estimation matrix $\hat{H}$ and on the interference covariance estimation matrix $\hat{R}$, and
- determining output signals r, which are an estimation of the K user-layer signals, by multiplying the intermediate signals $\tilde{y}$ with beamforming weights of the beamforming matrix $W_K$.

18. The BBU system according to claim 17, operable for determining the beamforming matrix $W_K$ as the first K rows of $(A^*A)^{-1}$, where A is an extended channel matrix, which is obtained based on the channel estimation matrix $\hat{H}$ and on the interference covariance estimation matrix $\hat{R}$, and $A^*$ is the transpose and conjugate of the extended channel matrix A.

19. The BBU system according to claim 18, wherein the extended channel matrix A comprises the channel estimation matrix $\hat{H}$ and an intermediate matrix G, and wherein the BBU system is operable for obtaining the intermediate matrix G from a decomposition of the interference covariance estimation matrix $\hat{R}$, wherein $\hat{R}$ is approximated as GG*.

20. The BBU system according to claim 17, wherein the received information on the channel estimation matrix $\hat{H}$ and on the interference covariance estimation matrix $\hat{R}$ contains ingredients from the channel estimation matrix $\hat{H}$ and on other channel information different from the channel estimation matrix.

* * * * *